United States Patent
Liu

(10) Patent No.: US 11,631,352 B2
(45) Date of Patent: Apr. 18, 2023

(54) DISPLAY PANEL AND DISPLAY DEVICE

(71) Applicants: WUHAN TIANMA MICROELECTRONICS CO., LTD., Wuhan (CN); Wuhan Tianma Microelectronics Co., Ltd. Shanghai Branch, Shanghai (CN)

(72) Inventor: Haimin Liu, Wuhan (CN)

(73) Assignees: WUHAN TIANMA MICROELECTRONICS CO., LTD., Wuhan (CN); Wuhan Tianma Microelectronics Co., Ltd. Shanghai Branch, Shanghai (CN)

( * ) Notice: Subject to any disclaimer, the term of this patent is extended or adjusted under 35 U.S.C. 154(b) by 0 days.

(21) Appl. No.: 17/559,064

(22) Filed: Dec. 22, 2021

(65) Prior Publication Data
US 2022/0114931 A1 Apr. 14, 2022

(30) Foreign Application Priority Data

Aug. 6, 2021 (CN) .......................... 202110900434.7

(51) Int. Cl.
*G09G 3/00* (2006.01)
(52) U.S. Cl.
CPC .................. *G09G 3/006* (2013.01)
(58) Field of Classification Search
CPC ............ G09G 3/006; H05K 9/0067; H01L 2224/8111; G02F 1/136204; H05F 3/00
See application file for complete search history.

(56) References Cited

U.S. PATENT DOCUMENTS

| 2001/0022639 A1 | 9/2001 | Kwak et al. |
| 2015/0216024 A1* | 7/2015 | Kwong ................ H05K 9/0067 361/220 |
| 2022/0077273 A1* | 3/2022 | Qing ........................ G02F 1/13 |

FOREIGN PATENT DOCUMENTS

CN 106711158 A 5/2017

* cited by examiner

*Primary Examiner* — Hang Lin
(74) *Attorney, Agent, or Firm* — Christensen O'Connor Johnson Kindness PLLC

(57) ABSTRACT

A display panel and a display device are provided. The display panel includes a display area and a non-display area, a first signal line and second signal lines located in the non-display area. The first signal line and the second signal lines are located on a same side of a substrate, in a different layer from the second signal lines. In a first area of the non-display area, the first signal line extends in a first direction and each second signal line extends in a second direction intersecting the first direction. An electrostatic buffer unit is disposed in the first area. Orthographic projections of the second signal lines and the electrostatic buffer unit onto a plane of the substrate at least partially overlap with an orthographic projection of the first signal line onto the plane of the substrate.

12 Claims, 8 Drawing Sheets

DISPLAY PANEL AND DISPLAY DEVICE

CROSS-REFERENCE TO RELATED APPLICATIONS

The present disclosure claims the benefit of priority to Chinese Patent Application No. 202110900434.7, filed on Aug. 6, 2021, the content of which is incorporated herein by reference in its entirety.

TECHNICAL FIELD

The present disclosure relates to the field of display technologies, and particularly, to a display panel and a display device.

BACKGROUND

Static electricity generated during the manufacturing process of display panels is transmitted on signal lines. For two signal lines whose extending directions cross each other, the static electricity is likely to discharge through an insulating layer located between the two signal lines at the position where the two signal lines overlap. Eventually, water vapor enters the display panel and corrodes the signal lines during the aging test, thereby affecting the product performance.

SUMMARY

In a first aspect, an embodiment of the present disclosure provides a display panel. The display panel has a display area and a non-display area. The display panel includes a first signal line and second signal lines that are located in the non-display area, a substrate, and at least one electrostatic buffer unit. The first signal line and the second signal lines are located on a same side of the substrate. The first signal line is located in a different layer from the second signal lines. The non-display area includes a first area, in which the first signal line extends in a first direction and each second signal line extends in a second direction intersecting the first direction. An orthographic projection of the first signal line onto a plane of the substrate at least partially overlaps with an orthographic projection of each second signal line onto the plane of the substrate. The at least one electrostatic buffer unit is disposed in the first area, and an orthographic projection of one of the at least one electrostatic buffer unit onto the plane of the substrate at least partially overlaps with the orthographic projection of the first signal line onto the plane of the substrate.

In a second aspect, an embodiment of the present disclosure provides a display device including the above display panel.

BRIEF DESCRIPTION OF DRAWINGS

In order to more clearly illustrate technical solutions of embodiments of the present disclosure, accompanying drawings used in the embodiments are briefly described below. The drawings described below are merely some of the embodiments of the present disclosure. Based on these drawings, those skilled in the art can obtain other drawings.

DESCRIPTION OF EMBODIMENTS

In order to better understand technical solutions of the present disclosure, the embodiments of the present disclosure are described in details with reference to the drawings. The described embodiments are merely part of the embodiments of the present disclosure rather than all of the embodiments. All other embodiments obtained by those skilled in the art shall fall into the protection scope of the present disclosure.

The terms used in the embodiments of the present disclosure are merely for the purpose of describing specific embodiments, rather than limiting the present disclosure. The terms "a", "an", "the" and "said" in a singular form in the embodiments of the present disclosure and the attached claims are also intended to include plural forms thereof, unless noted otherwise.

Figure 1:
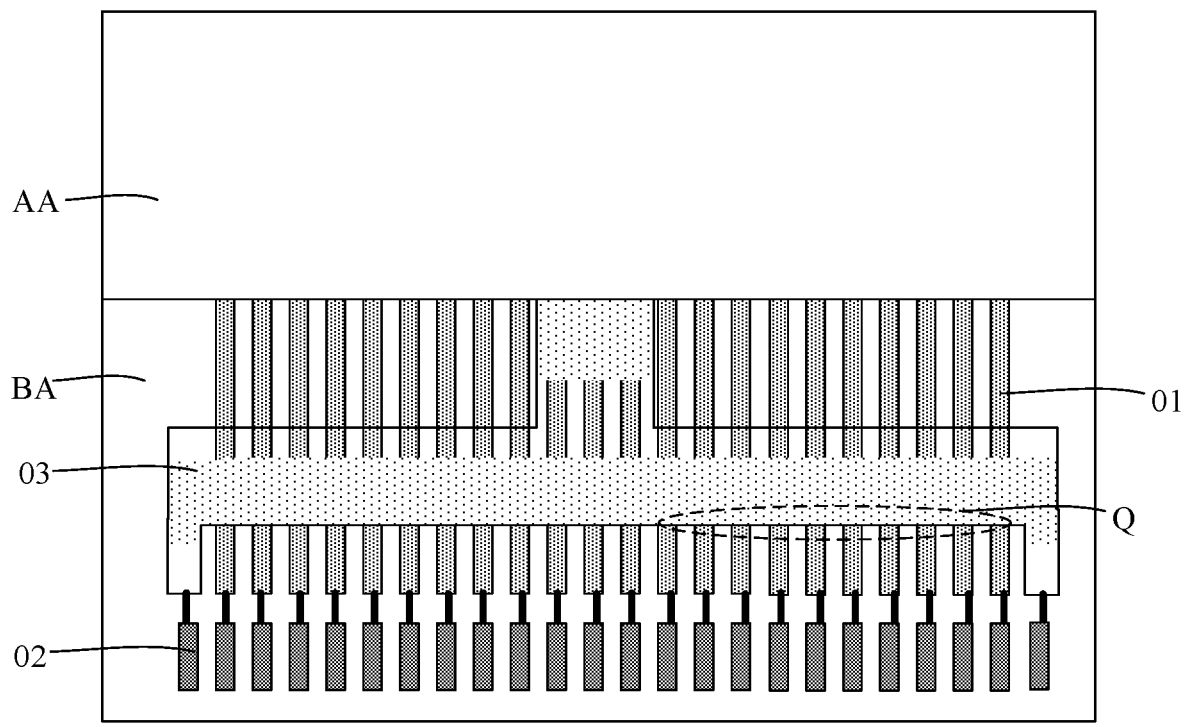
FIG. 1 is a partial schematic diagram of a display panel in the related art.

FIG. 1 is a partial schematic diagram of a display panel in the related art. As shown in FIG. 1, the display panel includes a plurality of data leads 01 located in a non-display area BA, and the data lead 01 has one end of connected to a binding terminal 02, and the other end is connected to a data line (not marked) located in a display area AA. A power lead 03 is also provided in the non-display area BA and extends to the display area AA after being led out by the binding terminal 02, and is connected to a power signal line located in the display area AA. The power lead 03 at least partially crosses a region where multiple data leads 01 are arranged, that is, the power leads 03 at least overlaps the multiple data leads 01. In the display panel in the related art, after the aging test on the display panel in the factory, it is found that there is a problem of abnormal display. It is inspected that some data leads 01 is incapable of transmitting signals normally, resulting in the abnormal display.

Electrostatic charges will be generated during the display panel manufacturing process, and the electrostatic charges will move in each lead. When the electrostatic charges moves in the power lead 03, an insulating layer located at a position (area Q shown in FIG. 1) where the power lead 03 and the data lead 01 overlap are broken through when a large number of electrostatic charges are accumulated, and thus the data lead 01 is slightly broken. In the subsequent aging test, water vapor will enter from the position where the insulating layer is broken through, which corroding the data lead 01 to, thereby affecting the product performance. With the above problems and related analysis, the present disclosure provides a display panel in which an electrostatic buffer unit is provided and the electrostatic buffer unit is at least partially overlapped with a power lead, and the electrostatic buffer unit is configured to store and discharge the static electricity generated in the manufacturing process, which prevent the static electricity from damaging the data leads, thereby improving product performance.

Figure 2:
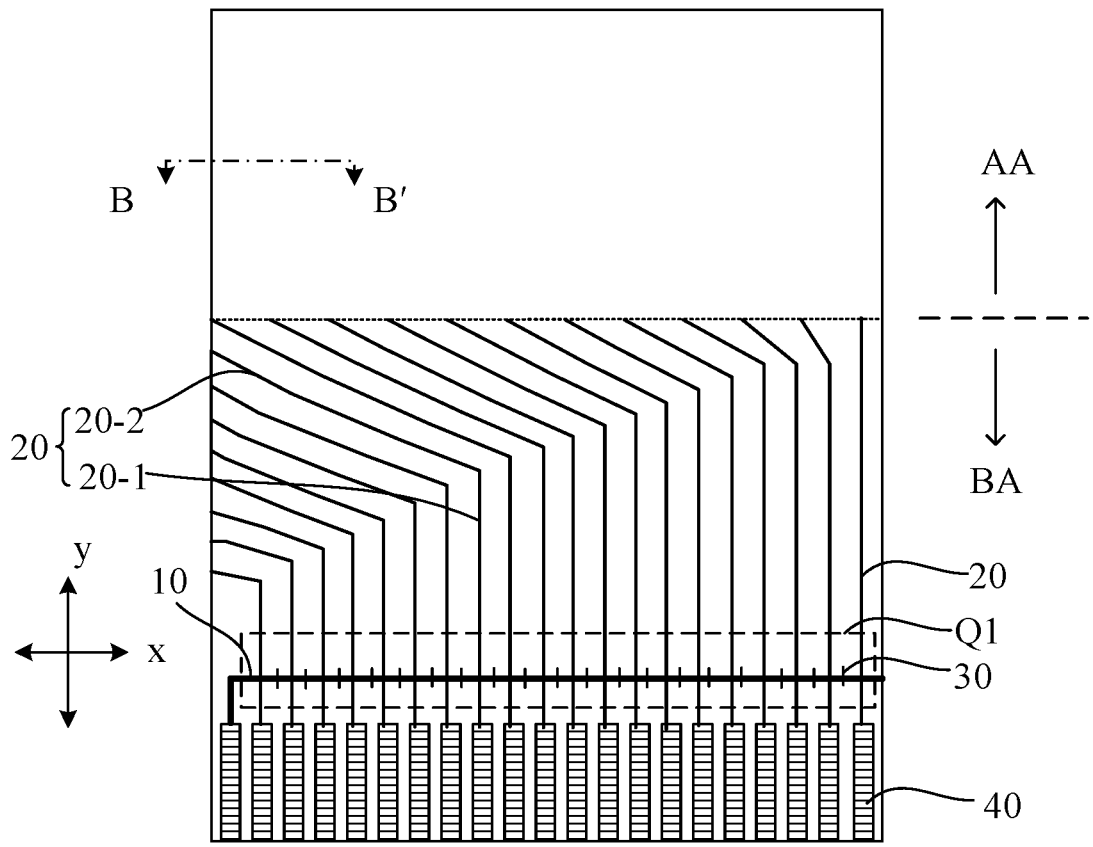
FIG. 2 is a schematic partial top view of a display panel provided by an embodiment of the present disclosure.

FIG. 2 is a schematic partial top view of a display panel provided by an embodiment of the present disclosure. As shown in FIG. 2, the display panel has a display area AA and a non-display area BA. The display panel includes a first signal line 10 and second signal lines 20 that are located the non-display area BA. The first signal line 10 and the second signal lines 20 are located on a same side of the substrate (not shown in FIG. 1), and the first signal line 10 is located in a different layer from the second signal line 20.

At least one second signal line 20 includes a first line segment 20-1 and a second line segment 20-2, and the first line segment 20-1 has one end connected to a binding terminal 40 and another end connected to the second line segment 20-2. The second line segment 20-2 has one end connected to the first line segment 20-1, and another end connected to a corresponding line located in the display area AA. Extending directions of the first line segments 20-1 are substantially the same as extending directions of the second signal lines 20, and an extending direction of the second line segment 20-2 is different from the extending direction of the first line segment 20-1. In some embodiments, the second signal lines 20 are arranged in a fan shape. The non-display area BA includes a first area Q1. In the first area Q1, the first signal line 10 extends along a first direction x, the second signal line 20 extends along a second direction y, and the first direction x and the second direction y intersect. A line width of the first signal line 10 in the first region Q1 is greater than a line width of the second signal line 20. The line width can be understood as a width of a signal line in a direction perpendicular to an extending direction of the signal line.

In the first region Q, an orthographic projection of the first signal line 10 onto the plane of the substrate at least partially overlaps with an orthographic projection of each of the second signal lines 20 onto the plane of the substrate. In other words, in the first region Q1, the first signal line 10 and the second signal line 20 at least partially overlap in a direction perpendicular to the plane of the substrate. FIG. 2 is a schematic top view of a display panel. It can be understood that the top view direction is the same as a projection direction of orthographic projections of signal lines onto the substrate. Therefore, in the top view, the first signal line 10 coincides with its orthographic projection onto the plane of the substrate, and the second signal line 20 coincides with its orthographic projection onto the plane of the substrate. The orthographic projections of the signal lines are not marked in FIG. 2. In FIG. 2, it is exemplarily illustrated that the first direction x and the second direction y are substantially perpendicular to each other. In some embodiments, an angle formed between the first direction x and the second direction y is not equal to 90°.

In the embodiment of the present disclosure, an electrostatic buffer unit 30 is provided in the first area Q1. It can be understood that, in the top view of FIG. 2, the electrostatic buffer unit 30 coincides with its orthographic projection onto the plane of the substrate. The orthographic projection of the electrostatic buffer unit 30 onto the plane of the substrate at least partially overlaps with an orthographic projection of the first signal line 10 onto the plane of the substrate. In other words, in the first region Q1, the electrostatic buffer unit 30 and the first signal line 10 at least partially overlap in the direction perpendicular to the substrate.

In the embodiment of the present disclosure, the electrostatic buffer unit 30 is arranged to overlap the first signal line 10. When the electrostatic charges generated in the manufacturing process of the display panel is transmitted on the first signal line 10, a capacitor is formed by the electrostatic buffer unit 30 and the first signal line 10 to store the static electricity, and after the static electricity is accumulated to a certain amount, the static electricity buffer unit 30 is broken through to discharge the static electricity. The present disclosure can prevent the electrostatic charges transmitted on the first signal line 10 from breaking through an insulating layer located at a position where the first signal line 10 and the second signal line 20 overlap, and prevent the second signal line 20 from being damaged, thereby protecting the second signal line 20 and improving product performance.

The display panel provided by an embodiment of the present disclosure includes a plurality of light-emitting devices and a plurality of pixel circuits. The pixel circuits are configured to drive the light-emitting devices to emit light, and the light-emitting device is an organic light-emitting device or an inorganic light-emitting device. In an embodiment, the first signal line 10 is a power lead, the first signal line 10 is electrically connected to a power signal line located in the display area AA, and the power signal line provides a power voltage signal to the pixel circuit. The second signal line 20 is a data lead located in the non-display area BA, and the second signal line 20 is electrically connected to a data line located in the display area AA. FIG. 2 also illustrates the binding terminals 40 located in the non-display area BA, and the first signal line 10 and the second signal line 20 are electrically connected to the binding terminal 40.

Figure 3:
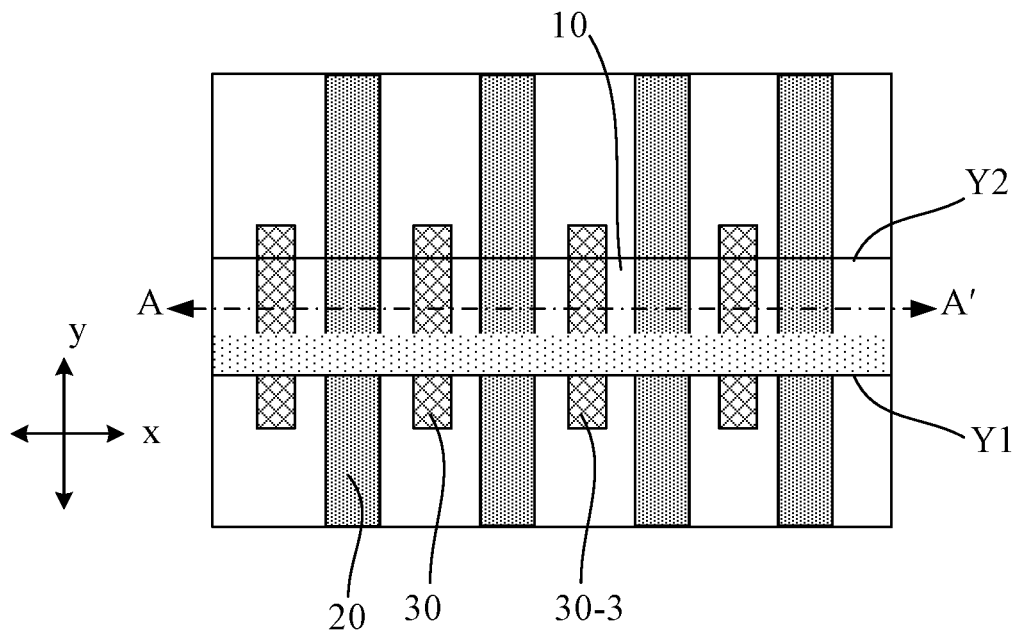
FIG. 3 is a partial enlarged schematic diagram of a first area of a display panel provided by an embodiment of the present disclosure.
Figure 4:
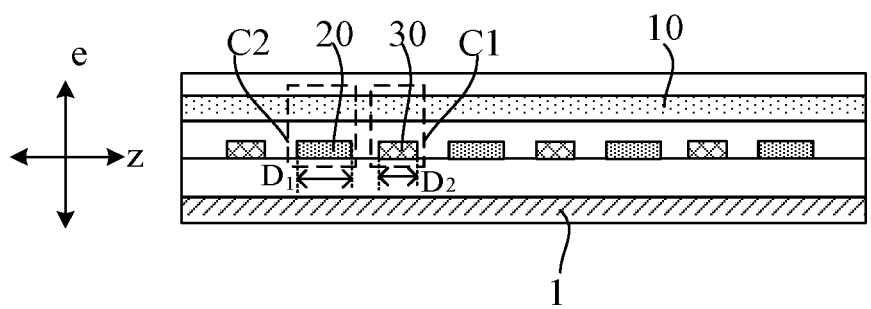
FIG. 4 is a schematic cross-sectional view along line A-A' shown in FIG. 3.

FIG. 3 is a partial enlarged schematic diagram of a first area of a display panel provided by an embodiment of the present disclosure, and FIG. 4 is a schematic cross-sectional along tangent line A-A' shown in FIG. 3. With reference to FIG. 3 and FIG. 4, the first signal line 10 and the second signal line 20 are located on the substrate 1. A third direction z and the second direction y are perpendicular to each other, that is, the third direction z is a width direction of the second signal line 20. The second signal line 20 has a width $D_1$ in the third direction z, the electrostatic buffer unit 30 has a width $D_2$ in the third direction z, and $D_2$ is smaller than D1. In an embodiment of the present disclosure, in a direction e perpendicular to the plane of the substrate 1, the electrostatic buffer unit 30 at least partially overlaps with the first signal line 10 to form a capacitor C1, and the second signal line 20 at least partially overlaps with the first signal line 10. The electrostatic buffer unit 30 and the first signal line 10 to form a capacitor C2.

FIG. 4 exemplarily illustrates that the electrostatic buffer unit 30 and the second signal line 20 are located in a same layer. The capacitance formula is $C=\varepsilon S/(4\pi kd)$, where $\varepsilon$ is a dielectric constant between two electrode plates of the capacitor, S is an effective overlap area of the two electrode plates of the capacitor, k is an electrostatic force constant, and d is a vertical distance between the two electrode plates of the capacitor. According to the capacitance formula, if D2 is smaller than D1, the capacitance C1 is smaller than the capacitance C2. According to $C=Q/U$ (Q denoting an amount of electricity of the capacitor, and U denoting a voltage between the two electrode plates of the capacitor), it can be seen that when the same charges are stored, the larger the capacitor, the smaller the voltage supplied on two terminals of the capacitor. In other words, a voltage that the capacitor C2 can withstand between the two electrode plates is greater than a voltage that the capacitor C1 can withstand. When static electricity is transmitted on the first signal line 10, the capacitor C1 formed by the electrostatic buffer unit 30 and the first signal line 10 will be damaged first after the static electricity accumulates to a certain amount, which can protect the second signal line 20.

In an embodiment, the width $D_2$ of the electrostatic buffer unit 30 in the third direction z is smaller than or equal to 2.5 µm. In an embodiment, the width $D_1$ of the second signal line 20 in the third direction z ranges from 3 µm and 5 µm. Under the condition that the process conditions are met, the width of the electrostatic buffer unit 30 can be made relatively small to ensure that the electrostatic buffer unit 30 is firstly broken through when the charges generated during the manufacturing process are transferred on the first signal line 10, which can protect the second signal line 20.

It should be noted that when the extending direction of the first signal line 10 and the extending direction of the second signal line 20 are perpendicular to each other, that is, when the first direction x and the second direction y are perpendicular to each other, the third direction z is the same as the first direction x. When the first direction x and the second direction y form an angle not equal to 90°, the third direction z and the second direction y are perpendicular to each other, and the third direction z and the first direction x form a non-zero angle.

In an embodiment of the present disclosure, at least one electrostatic buffer unit 30 is arranged at at least one side of at least one second signal line 20 along an arrangement direction of the second signal lines 20. That is, in some embodiments, for one second signal line 20, the electrostatic buffer unit 30 is provided at only one side of the second signal line 20. In some embodiments, for one second signal line 20, the electrostatic buffer unit 30 is provided at both sides of the second signal line 20. In some embodiments, multiple electrostatic buffer units 30 are provided, and each of the electrostatic buffer units 30 is located between two adjacent second signal lines 20.

In the embodiment of the present disclosure, "adjacent" refers to being adjacent in the arrangement direction of the second signal lines 20. In the arrangement direction of the second signal line 20, one electrostatic buffer unit 30 is located at one side of the second signal line 20. That is, in the arrangement direction of the second signal line 20, one electrostatic buffer unit 30 is adjacent to one second signal line 20; in other words, an orthographic projection of the electrostatic buffer unit 30 on the substrate 1 and ab orthographic projection of the second signal line 20 on the substrate 1 are separated with a certain distance. As shown in FIG. 4, when the electrostatic buffer unit 30 and the second signal line 20 are located in the same layer, the electrostatic buffer unit 30 and the second signal line 20 are adjacent to each other with a certain distance therebetween. The distance can be determined according to the manufacturing process conditions of the second signal line, and when the yield rate of the second signal line is satisfied, it is ensured that the second signal line 20 and the electrostatic buffer unit 30 are insulated from each other. As shown in FIG. 3, taking an electrostatic buffer unit 30-3 as an example, the electrostatic buffer unit 30-3 is adjacent to two second signal lines 20. That is, two second signal line 20 are located at a left side and a right side of the electrostatic buffer unit 30-3, respectively. In the embodiment of the present disclosure, the electrostatic protection of the second signal line is achieved by providing the structure of the electrostatic buffer unit and a relative position of the electrostatic buffer unit and the layer of the second signal line adjacent to the electrostatic buffer unit.

In some embodiments, in the arrangement direction of the second signal lines 20, the electrostatic buffer unit 30 can simultaneously protect the two second signal lines 20 respectively located at both sides of the electrostatic buffer unit 30. As shown in an embodiment of FIG. 4, the electrostatic buffer unit 30 and the second signal line 20 are located in the same layer, and the relative positional relationships between the electrostatic buffer unit 30 and the two adjacent second signal lines 20 are the same. In the embodiment, the electrostatic buffer unit 30 can simultaneously protect the two second signal lines 20 located at both sides of the electrostatic buffer unit 30.

In some embodiments, in the arrangement direction of the second signal lines 20, the electrostatic buffer unit 30 is located between two adjacent second signal lines 20, and the electrostatic buffer unit 30 can protect one of the two second signal lines 20. In the following related embodiments, the above two cases will also be described.

Figure 5:
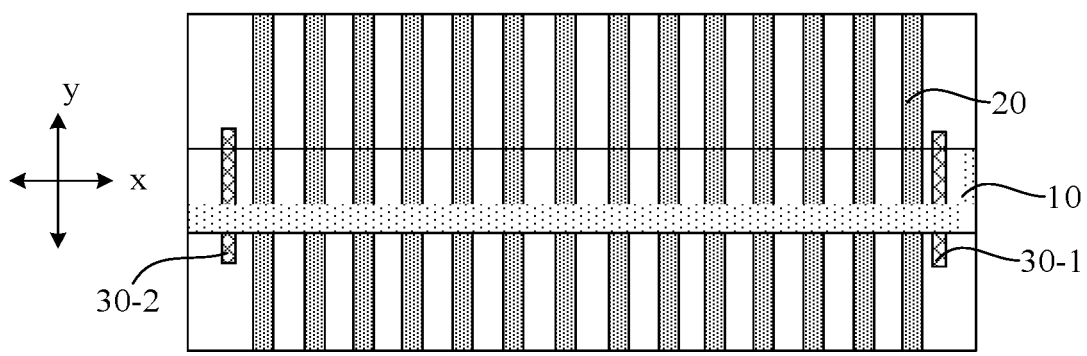
FIG. 5 is another schematic diagram of a first area of a display panel provided by an embodiment of the present disclosure.

FIG. 5 is another schematic diagram of a first area of a display panel provided by an embodiment of the present disclosure. As shown in FIG. 5, two electrostatic buffer units are provided in the first area Q1, namely, electrostatic buffer units 30-1 and 30-2. The electrostatic buffer unit 30-1 is located at a side of a first one of the second signal line 20 in the arrangement direction of the second signal lines 20, and the electrostatic buffer unit 30-2 is located at a side of a last one of the second signal lines 20 in the arrangement direction of the second signal lines 20. The static electricity generated during the manufacturing process of the display panel can be transmitted from left to right on the first signal line 10 or from right to left on the second signal line 10. Taking the arranged multiple second signal lines 20 as a signal line group, this embodiment is equivalent to arranging electrostatic buffer units at both sides of the signal line group. When static electricity is transmitted on the first signal line 10 and is not transmitted to the position of the first signal line 10 that overlaps with the second signal line 20, the static electricity is first transmitted to the position where the electrostatic buffer unit 30 overlaps with the first signal line 10, and the static electricity can be stored and discharged by the electrostatic buffer unit 30, which can prevent the electrostatic charges from breaking through the insulating layer located at the position where the first signal line 10 and the second signal line 20 overlap, and thus can protect the second signal line 20.

Figure 6:
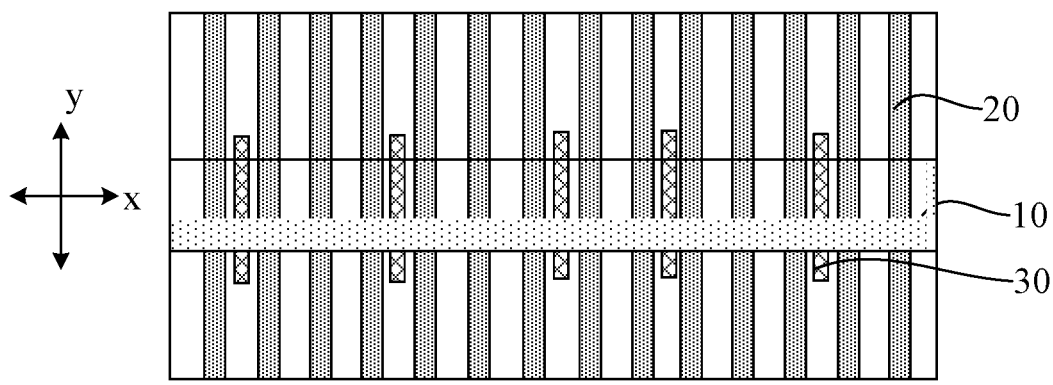
FIG. 6 is another schematic diagram of a first area of a display panel provided by an embodiment of the present disclosure.

FIG. 6 is another schematic diagram of a first area of a display panel provided by an embodiment of the present disclosure. In some embodiments, as shown in FIG. 6, the electrostatic buffer units 30 are provided in the first area Q1, and the orthographic projection of the unit 30 onto the plane of the substrate 1 is located between the orthographic projections of the two adjacent second signal lines 20 onto the plane of the substrate 1. With reference to the structure of the electrostatic buffer unit 30 and the relative positions of the electrostatic buffer unit 30 and the layers of the two adjacent second signal lines, the electrostatic buffer unit 30 can protect at least the second signal lines 20 located at both sides of the electrostatic buffer unit 30.

In some embodiments, as shown in FIG. 2 and FIG. 3, the orthographic projections of the electrostatic buffer units 30 onto the plane of the substrate 1 and the orthographic projections of the second signal lines 20 onto the plane of the substrate 1 are alternately distributed. With such configuration, at least one side of each second signal line 20 can be provided with the electrostatic buffer unit 30, and the multiple electrostatic buffer units 30 can buffer and discharge the static electricity at multiple positions of the first signal line 10 to ensure that each second signal line 20 is not broken through by the static electricity.

In some embodiments, the electrostatic buffer unit 30 is located on a side of the first signal line 10 facing towards the substrate 1. The second signal line 20 is located on a side of the first signal line 10 facing towards the substrate 1, that is, the electrostatic buffer unit 30 and the second signal line 20 are located on a same side of the first signal line 10. The electrostatic buffer unit 30 can be manufactured by reusing the conventional conductive layer (such as a metal layer or a semiconductor layer) in the display panel without adding a new process.

Figure 7:
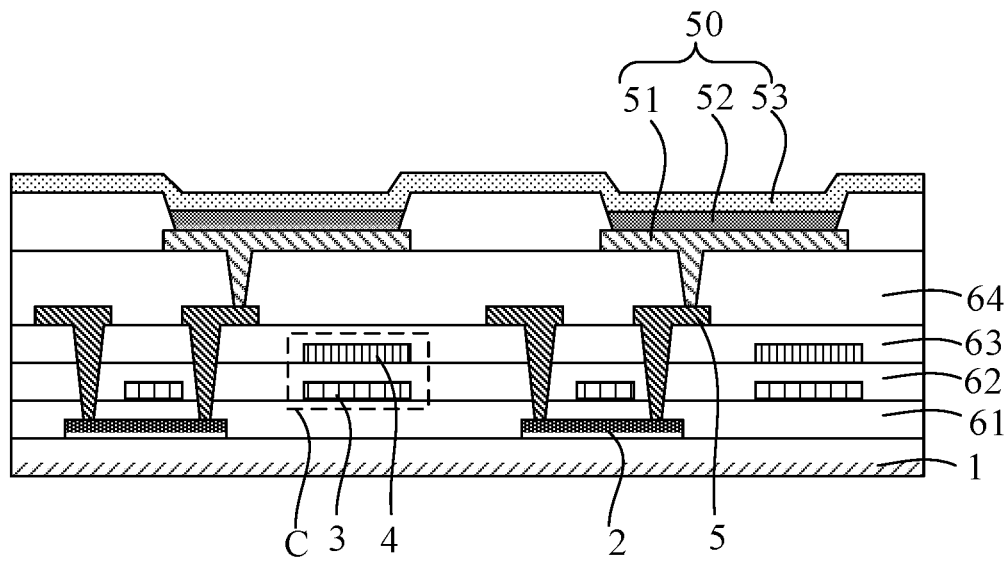
FIG. 7 is a schematic cross-sectional view along tangent line B-B' shown in FIG. 2.

FIG. 7 is a schematic cross-sectional view along tangent line B-B' shown in FIG. 2, and FIG. 7 illustrates a layer structure of the display panel. As shown in FIG. 7, the display panel includes a semiconductor layer 2, a first metal layer 3, a second metal layer 4, and a third metal layer 5 that are located on a side of the substrate 1 and arranged in a direction away from the substrate 1. An active layer of the transistor is located in the semiconductor layer 2, the storage capacitor in the pixel circuit has one electrode plate located in the first metal layer 3 and the other electrode plate located in the second metal layer 4, and the data line is located in the third metal layer 5. The display panel further includes a light emitting device 50 which includes a first electrode 51, a light emitting layer 52 and a second electrode 53 that are stacked, and the first electrode 51 is located on a side of the light emitting layer 52 facing towards the substrate 1. FIG. 7 also illustrates a first insulating layer 61 located between the semiconductor layer 2 and the first metal layer 3, a second insulating layer 62 located between the first metal layer 3 and the second metal layer 4, and a third insulating layer 63 located between the second metal layer 4 and the third metal layer 5, and a fourth insulating layer 64 located between the third metal layer 5 and the light emitting device 50. In an embodiment, the first insulating layer 61, the second insulating layer 62, and the third insulating layer 63 are all inorganic insulating layers, and the fourth insulating layer 64 includes an organic insulating layer.

FIG. 7 illustrates a storage capacitor C in the pixel circuit, and the storage capacitor C includes one electrode plate located in the first metal layer 3 and the other electrode plate located in the second metal layer 4.

In an embodiment, the semiconductor layer 2 is made of silicon. In another embodiment, the semiconductor layer 2 is made of metal oxide.

In an embodiment, the first metal layer 3 and the second metal layer 4 are made of a same material including metallic molybdenum. The third metal layer 5 is made of metal titanium and metal aluminum. In an embodiment, the third metal layer 5 has a three-layer structure of titanium/aluminum/titanium.

In another embodiment, the display panel further includes a fourth metal layer (not shown in the figure) located between the third metal layer 5 and the first electrode 51. In an embodiment, the fourth metal layer and the third metal layer 5 are made of a same material.

In an embodiment, the first signal line 10 is located in the third metal layer 5, and the plurality of second signal lines 20 are located in a same layer that is different from a layer where the third metal layer is located. In an embodiment, the second signal lines 20 are all located in the first metal layer 3 or the second metal layer 4.

Figure 8:
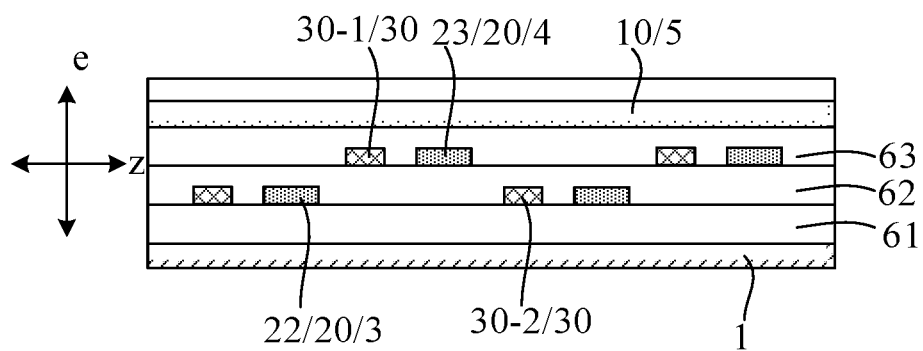
FIG. 8 is another schematic cross-sectional view along tangent line A-A' shown in FIG. 3.

FIG. 8 is another schematic cross-sectional view alone tangent line A-A' shown in FIG. 3. In another embodiment, as shown in FIG. 8, the second signal line 20 includes second signal sub-lines 22 and third signal sub-lines 23 that are in an alternating arrangement, the second signal sub-line 22 is located in the first metal layer 3, the third signal sub-line 23 is located in the second metal layer 4, and the first signal line 10 is located in the third metal layer 5. In the embodiment, multiple second signal lines 20 that transmit signals of a same type are arranged in two metal layers for wiring, which can reduce a total width of the multiple second signal lines 20 in the third direction z in the first area, which saves space in the non-display area.

In an embodiment of the present disclosure, the electrostatic buffer unit 30 is located at at least one side of at least one second signal line 20 in the arrangement direction of the second signal lines 20. In other words, the orthographic projection of the electrostatic buffer unit 30 onto the plane of the substrate 1 is adjacent to the orthographic projection of at least one second signal line 20 onto the plane of the substrate 1. The following embodiment takes the electrostatic buffer unit 30 being located at a side of one second signal line 20 (the name of the first signal sub-line is used for description in the following related embodiments) as an example, and the structure of the electrostatic buffer unit 30 and the layer positional relationship between the electrostatic buffer unit 30 and the second signal line 20 will be described with reference to the layer structure of the display panel shown in FIG. 7.

In addition, it should be noted that in the embodiments of FIG. 8 to FIG. 18, one structure is filled with one pattern, for example, the first signal line 10 is filled with one pattern; the first signal sub-line 21 is filled with another pattern filling;

and the first unit portion 31, the second unit portion 32, the third unit portion 33, and the fourth unit portion 34 are filled with another four different patterns, respectively. The filling pattern each structure in the embodiment of FIG. 8 to FIG. 18 does not correspond to the filling pattern of the metal layer where it is located. In the drawings, the metal layers where structures are located are indicated by reference numerals, respectively. For example, in the embodiment of FIG. 8, the second signal line 20 includes the second signal sub-line 22, and the second sub-signal line 22 is located in the first metal layer 3, the reference number of the second signal sub-line 22 is 22/20/3, and the reference number "3" indicates that the second signal sub-line 22 is located in the first metal layer 3.

Figure 9:
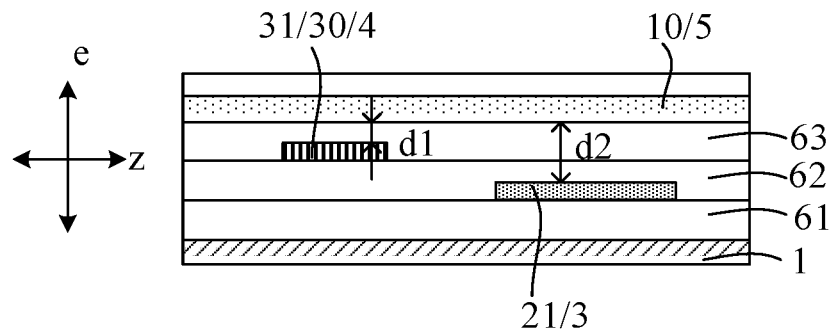
FIG. 9 is a partial schematic diagram of a layer structure in a first area of a display panel provided by an embodiment of the present disclosure.

FIG. 9 is a partial schematic diagram of a layer structure in a first area of a display panel provided by an embodiment of the present disclosure. The third direction z is also shown in FIG. 9. That is, the extending direction of the section line of the layer structure is parallel to the third direction z. As shown in FIG. 9, the electrostatic buffer unit 30 includes a first unit portion 31. In the direction e perpendicular to the substrate 1, a distance d1 is formed between the first unit portion 31 and the first signal line 10, and a distance d2 is formed between the first signal sub-line 21 and the first signal line 10, where d1<d2. The display panel includes conductive layers (such as a metal layer or a semiconductor layer) and an insulating layer located between the conductive layers. Since the distance between the first unit portion 31 and the first signal line 10 is smaller than the distance between the first signal sub-line 21 and the first signal line 10, a thickness of the insulating layer located between the first unit portion 31 and the first signal line 10 is smaller than a thickness of the insulating layer located between the signal sub-line 21 and the first signal line 10. When the static electricity is transmitted on the first signal line 10, the insulating layer having a relatively smaller thickness is more likely to be broken through by the static electricity. Then the capacitance formed between the first unit portion 31 and the first signal line 10 will first store the static electricity accumulated on the first signal line 10, and when the static electricity accumulates to a certain amount, it will break through the first unit portion 31 first, thereby protecting the first signal sub-line 21. In other words, by providing the electrostatic buffer unit 30, the second signal line 20 is prevented from being broken through by the static electricity.

In an embodiment, as shown in FIG. 9, the first signal line 10 is located in the third metal layer 5, the first signal sub-line 21 is located in the first metal layer 3, and the first unit portion 31 is located in the second metal layer 4. The insulating layer located between the first unit portion 31 and the first signal line 10 is the third insulating layer 63, and the insulating layer located between the first signal sub-line 21 and the first signal line 10 includes a second insulating layer 62 and a third insulating layer 63. In this embodiment, the first unit portion 31 reuses the original layer of the display panel without increasing manufacturing process. The condition, d1<d2, indicates that the thickness of the insulating layer located between the first unit portion 31 and the first signal line 10 is smaller than the thickness of the insulating layer located between the first signal sub-line 21 and the first signal line 10, and when the static electricity is transmitted on the first signal line 10, the first unit portion 31 is more likely to be broken through by the static electricity than the first signal sub-line 21. The orthographic projection of the first unit portion 31 on the substrate 1 is adjacent to the orthographic projection of the first signal sub-line 21 on the substrate 1, so that the first unit portion 31 can perform electrostatic protection on the first signal sub-line 21.

Figure 10:
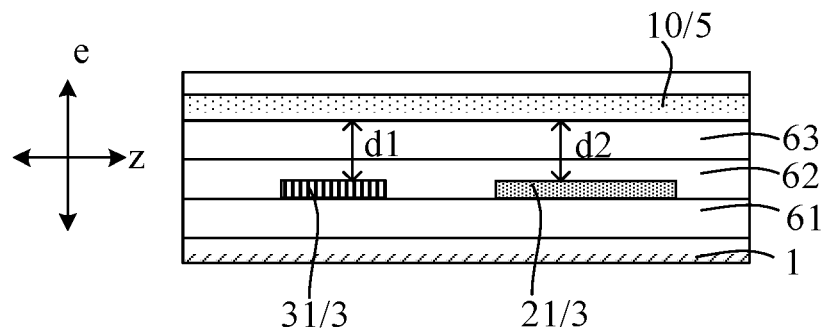
FIG. 10 is another partial schematic diagram of a layer structure in a first area of a display panel provided by an embodiment of the present disclosure.

FIG. 10 is another partial schematic diagram of a layer structure in a first area of a display panel provided by an embodiment of the present disclosure, and an extending direction of a section line of the layer structure in FIG. 10 is parallel to the third direction z. In an embodiment, as shown in FIG. 10, the first signal line 10 is located in the third metal layer 5, and the first signal sub-line 21 and the first unit portion 31 are located in the first metal layer 3. The second insulating layer 62 and the third insulating layer 63 are located between the first metal layer 3 and the third metal layer 5. In the direction e perpendicular to the substrate 1, the distance d1 between the first unit portion 31 and the first signal line 10 is equal to the distance d2 between the first signal sub-line 21 and the first signal line 10. In this embodiment, the width of the first unit portion 31 in the third direction z is smaller than the width of the first signal sub-line 21 in the third direction z, which can make the capacitance formed by the first unit portion 31 and the first signal line 10 smaller than the capacitance formed by the first signal sub-line 21 and the first signal line 10. The capacitance formed by the first unit portion 31 and the first signal line 10 first stores the static electricity, and when the static electricity accumulates to a certain amount, the first unit portion 31 will be broken through first to protect the first signal sub-line 21.

Figure 11:
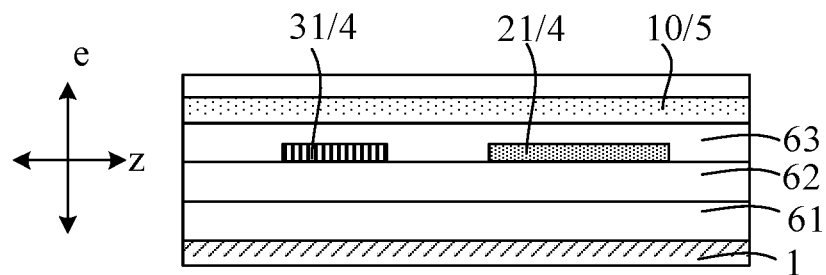
FIG. 11 is another partial schematic diagram of a layer structure in a first area of a display panel provided by an embodiment of the present disclosure.

FIG. 11 is another partial schematic diagram of a layer structure in a first area of a display panel provided by an embodiment of the present disclosure, and a section line of the layer structure in FIG. 11 extends in a direction parallel to the third direction z. In another embodiment, as shown in FIG. 11, the first signal line 10 is located in the third metal layer 5, and the first signal sub-line 21 and the first unit portion 31 are both located in the second metal layer 4. In some embodiments, the third metal layer 5 is made of three layers of metal, i.e., titanium/aluminum/titanium, the first metal layer 3 and the second metal layer 4 are made of metal molybdenum, and a signal line made of the third metal layer 5 has a sheet resistance smaller than a sheet resistance of a signal line made of the second metal layer 4. In an embodiment, the first signal line 10 is a power line, which can reduce a voltage drop on the first signal line 10, thereby reducing the power consumption of the display panel. The second metal layer 4 can be a metal layer closest to the first signal line 10 on the substrate 1, and the first unit portion 31 is disposed in the second metal layer 4. First, the first unit portion 31 can be manufactured by reusing the original manufacturing process of the display panel; and secondly, the first unit portion 31 can not only perform electrostatic protection on the second signal line located in the second metal layer 4, but also can perform electrostatic protection on the second signal line located in the first metal layer 3.

In this embodiment, the width of the first unit portion 31 in the third direction z is smaller than the width of the first signal sub-line 21 in the third direction z, which can make the capacitance formed by the first unit portion 31 and the first signal line 10 smaller than the capacitance formed by the first signal sub-line 21 and the first signal line 10. Then the capacitance formed by the first unit portion 31 and the first signal line 10 first stores the static electricity accumulated on the first signal line 10, and when the static electricity accumulates to a certain amount, it will break the first unit portion 31 first, which can protect the first signal sub-line 21.

Figure 12:
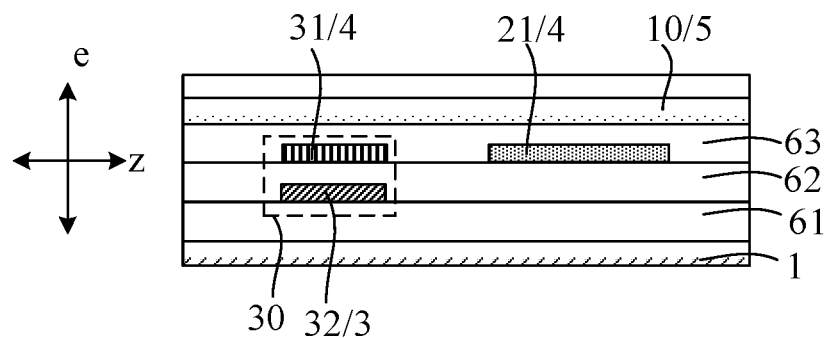
FIG. 12 is another partial schematic diagram of a layer structure in a first area of a display panel provided by an embodiment of the present disclosure.

FIG. 12 is another partial schematic diagram of a layer structure in a first area of a display panel provided by an embodiment of the present disclosure, and an extending direction of a section line of the layer structure in FIG. 12 is parallel to the third direction z. In another embodiment, as shown in FIG. 12, the electrostatic buffer unit 30 further includes a second unit portion 32 located at a side of the first unit portion 31 facing towards the substrate 1, and the first unit portion 31 and the second unit portion 32 at least partially overlap in the direction e perpendicular to the substrate 1. In this embodiment, the electrostatic buffer unit 30 includes a double-layered unit portion, and a capacitance can be formed by the first unit portion 31 and the first signal line 10. When the electrostatic charges transmitted on the first signal line 10 break through the insulating layer located between the first unit portion 31 and the first signal line 10, the first unit portion 31 and the first signal line 10 are electrically connected to each other, and the electrostatic charges are transmitted to the first unit portion 31 through the first signal line 10; and at this time, a capacitor can be formed by the second unit portion 32 and the first unit portion 31. In some embodiments, if the distance between the second unit portion 32 and the first unit portion 31 is not greater than the distance between the first signal sub-line 21 and the first signal line 10, then the capacitor formed by the second unit portion 32 and the first unit portion 31 can continue to store and discharge the static electricity transmitting on the first unit portion 31, and continue to prevent the static electricity from breaking through the first signal sub-line 21, which can achieve a double protection for the first signal sub-line and reduce a risk of the first signal sub-line 21 being breaking through by the static electricity.

In an embodiment, as shown in FIG. 12, the first signal line 10 is located in the third metal layer 5, the first signal sub-line 21 is located in the second metal layer 4; the first unit portion 31 is located in the second metal layer 4, and the second unit portion 32 is located in the first metal layer 3. In this embodiment, both the first unit portion 31 and the second unit portion 32 are manufactured by reusing original layers of the display panel without adding new processes. The first unit portion 31 and the first signal sub-line 21 are located in a same layer, the distance between the first unit portion 31 and the first signal line 10 is substantially the same as the distance between the first signal sub-line 21 and the first signal line 10, and the thickness of the insulating layer located between the first unit portion 31 and the first signal line 10 is substantially the same as the thickness of the insulating layer located between the first signal sub-line 21 and the first signal line 10. By setting the width of the first unit portion 31 in the third direction z to be smaller than the width of the first signal sub-line 21 in the third direction z, it is realized that the static electricity transmitted on the first signal line 10 first breaks through the first unit portion 31 after it has accumulated to a certain amount, so that the first signal sub-line 21 is protected. After the first unit portion 31 is broken through, a capacitor can be formed by the first unit portion 31 and the second unit portion 32 to continue to store and discharge static electricity, so as to achieve a double protection for the first signal sub-line 21.

In an embodiment, on the basis of the embodiment of FIG. 12, the electrostatic buffer unit 30 further includes a fifth unit portion located on a side of the second unit portion 32 facing towards the substrate 1. The fifth unit portion and the second unit portion 32 at least partially overlap in the direction e perpendicular to the substrate 1. In an embodiment, the fifth unit portion is located in the semiconductor layer 2. In other words, the electrostatic buffer unit 30 includes a structure of three-layer unit portions. After the unit portion far away from the substrate 1 is broken through by the static electricity, a capacitor is still formed by the unit portion broken through by the static electricity and the unit portion below it. By setting the width of each unit portion in the third direction z and the distance between adjacent unit portions in the direction e perpendicular to the substrate 1, the capacitor formed by the unit portion broken through by the static electricity and the unit portion below continues to buffer and discharge the static electricity, which can achieve multiple protections for the first signal sub-line and reduce the risk of the first signal sub-line being broken through by the static electricity.

In another embodiment, the first signal line 10 is located in the third metal layer 5, the first signal sub-line 21 is located in the second metal layer 4; the first unit portion 31 is located in the second metal layer 4, and the second unit portion 32 is located in the semiconductor layer 2, which is not shown in drawings.

Figure 13:
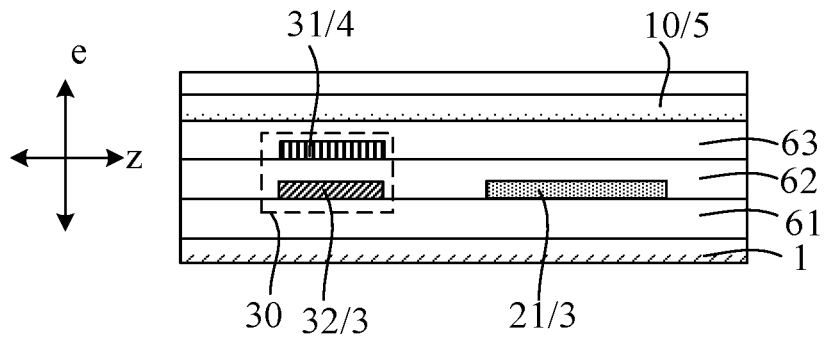
FIG. 13 is another partial schematic diagram of a layer structure in a first area of a display panel provided by an embodiment of the present disclosure.

FIG. 13 is another partial schematic diagram of a layer structure in a first area of a display panel provided by an embodiment of the present disclosure, and an extending direction of a section line of the layer structure shown in FIG. 13 is parallel to the third direction z. In another embodiment, as shown in FIG. 13, the first signal line 10 is located in the third metal layer 5, the first signal sub-line 21 is located in the first metal layer 3; the first unit portion 31 is located in the second metal layer 4, and the second unit portion 32 is located in the first metal layer 3. In this embodiment, the second unit portion 32 and the first signal sub-line 21 are located in a same layer, and the distance between the first unit portion 31 and the first signal line 10 is smaller than the distance between the first signal sub-line 21 and the first signal line 10. When the static electricity accumulates on the first signal line 10, the capacitance formed between the first signal line 10 and the first unit portion 31 can buffer and discharge the static electricity. When the amount of static electricity accumulation is relatively large, the static electricity first breaks through the first unit portion 31 to protect the first signal sub-line 21; after the first unit portion 31 is broken through by the static electricity, when the static electricity accumulates on the first signal line 10 again, the static electricity is transferred to the first signal line 10 through the first signal line 10. At this time, the distance between the first unit portion 31 and the second unit portion 32 is smaller than the distance between the first signal sub-line 21 and the first signal line 10, and a capacitor formed by the first unit portion 31 and the second unit portion 32 continues to store and discharge the static electricity, and the electrostatic protection can be performed on the first signal sub-line 21 again. This embodiment can achieve a double protection for the first signal sub-line 21 and reduce the risk of the first signal sub-line 21 being broken through by the static electricity.

Figure 14:
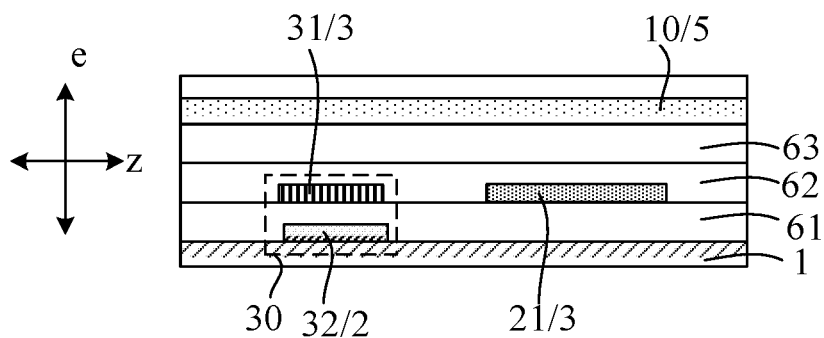
FIG. 14 is another partial schematic diagram of a layer structure in a first area of a display panel provided by an embodiment of the present disclosure.

FIG. 14 is another partial schematic diagram of a layer structure in a first area of a display panel provided by an embodiment of the present disclosure, and an extending direction of a section line of the layer structure shown in FIG. 14 is parallel to the third direction z. In another embodiment, as shown in FIG. 14, the first signal line 10 is located in the third metal layer 5, the first signal sub-line 21 and the first unit portion 31 are both located in the first metal layer 3, and the second unit portion 32 is located in the semiconductor layer 2. In this embodiment, the first unit portion 31 and the first signal sub-line 21 are located in a same layer. The static electricity accumulated on the first signal line 10 first breaks through the first unit portion 31, so that the first unit portion 31 can perform electrostatic protection on the first signal sub-line 21. The first unit portion 31 and the second unit portion 32 are spaced by the first insulating layer 61, and the first signal sub-line 21 and the first signal line 10 are spaced by the second insulating layer 62 and the third insulating layer 63; and thus the thickness of the insulating layer located between the first unit portion 31 and the second unit portion 32 is smaller than the thickness of the insulating layer located between the first signal sub-line 21 and the first signal line 10. After the first unit portion 31 is broken through by the static electricity, the static electricity that continues to accumulate on the first signal line 10 is transferred to the first unit portion 31, and then a capacitor can be formed between the first unit portion 31 and the second unit portion 32 to continue to store and discharge the static electricity, which can prevent the static electricity from breaking through the first signal sub-line again, thereby realizing double protection for the first signal sub-line and reducing the risk of the first signal sub-line 21 being broken through by the static electricity.

Figure 15:
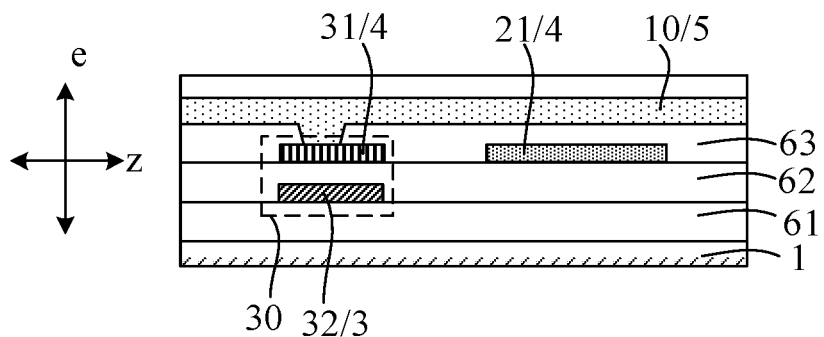
FIG. 15 is another partial schematic diagram of a layer structure in a first area of a display panel provided by an embodiment of the present disclosure.

FIG. 15 is another partial schematic diagram of a layer structure in a first area of a display panel provided by an embodiment of the present disclosure, and the section line of the layer structure in FIG. 15 extends along the direction parallel to the third direction z. In another embodiment, as shown in FIG. 15, the first unit portion 31 is electrically connected to the first signal line 10. In an embodiment, the first unit portion 31 and the first signal line 10 are electrically connected to each other through a via located on the insulating layer. In this embodiment, the static electricity on the first signal line 10 is transmitted to the first unit portion 31, and the capacitance formed by the first unit portion 31 and the second unit portion 32 can store and discharge the static electricity, which can reduce the risk of the first signal sub-line 21 being broken through by the static electricity. The electrical connection between the first unit portion 31 and the first signal line 10 can reduce the impedance of the first signal line 10, which is also conducive to the dissipation of the static electricity on the first signal line 10, and can also reduce the risk of the first signal sub-line 21 being broken through by the static electricity.

Figure 16:
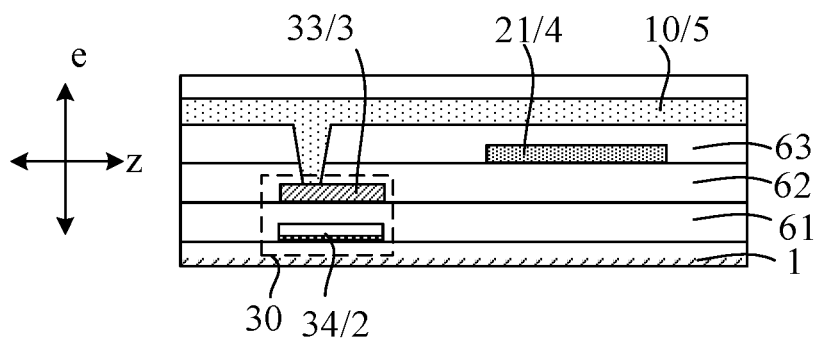
FIG. 16 is another partial schematic diagram of a layer structure in a first area of a display panel provided by an embodiment of the present disclosure.

FIG. 16 is another partial schematic diagram of a layer structure in a first area of a display panel provided by an embodiment of the present disclosure, and an extending direction of the section line of the layer structure in FIG. 16 is parallel to the third direction z. In another embodiment, as shown in FIG. 16, the electrostatic buffer unit 30 includes a third unit portion 33 located on a side of the first signal sub-line 21 facing towards the substrate 1, and a fourth unit portion 34 is located on a side of the third unit portion 33 facing towards the substrate 1, and the third unit portion 33 and the fourth unit portion 34 at least partially overlap in the direction e perpendicular to the substrate 1. The third unit portion 33 is electrically connected to the first signal line 10. In an embodiment, the third unit portion 33 is electrically connected to the first signal line 10 through the via located on the insulating layer. In this embodiment, the static electricity on the first signal line 10 is transmitted to the third unit portion 33, and the thickness of the insulating layer located between the third unit portion 33 and the fourth unit portion 34 is not greater than the thickness of the insulating layer located between the first signal sub-line 21, which enables the capacitance formed between the third unit portion 33 and the fourth unit portion 34 to store and discharge the static electricity. That is, the static electricity will break through the fourth unit portion 34 to be discharged, which can reduce the risk of the first signal sub-line 21 being broken through by electrostatic damage. The electrical connection between the third unit portion 33 and the first signal line 10 can reduce the impedance of the first signal line 10, which is also conducive to the dissipation of the static electricity on the first signal line 10, and can also reduce the risk of the first signal sub-line 21 being broken through by electrostatic damage.

As shown in FIG. 16, the first signal line 10 is located in the third metal layer 5, the first signal sub-line 21 is located in the second metal layer 4, the third unit portion 33 is located in the first metal layer 3, and the fourth unit portion 34 is located in the semiconductor layer 2. In this embodiment, the third unit portion 33 is located on a side of the first signal sub-line 21 facing towards the substrate 1. In the direction e perpendicular to the substrate 1, the distance between the third unit portion 33 and the first signal line 10 is greater than the distance between the first signal sub-line 21 and the first signal line 10. In this embodiment, the third unit portion 33 and the fourth unit portion 34 are located layers different from a layer where the first signal sub-line 21 is located, and when multiple second signal lines are provided in the second metal layer 4, the electrostatic buffer unit (including the third unit portion 33 and the fourth unit portion 34) does not occupy the space of the second metal layer 4.

The foregoing embodiments of FIG. 9 to FIG. 16 all take one first signal sub-line 21 of the second signal lines 20 as an example to illustrate the structure of the electrostatic buffer unit 30. In the embodiment of the present disclosure, the description of the foregoing embodiment can be referred to, and the structure of the electrostatic buffer unit 30 is set according to the position of the layer where the second signal line is located. In some embodiments, a plurality of electrostatic buffer units 30 is provided in the first region Q1, the structures of these electrostatic buffer units 30 are the same, and the layer positions of all unit portions are the same. In some embodiments, a plurality of electrostatic buffer units 30 is provided in the first region Q1, the structures of the electrostatic buffer units 30 are different, and the layer positions of all unit portions are different.

Figure 17:
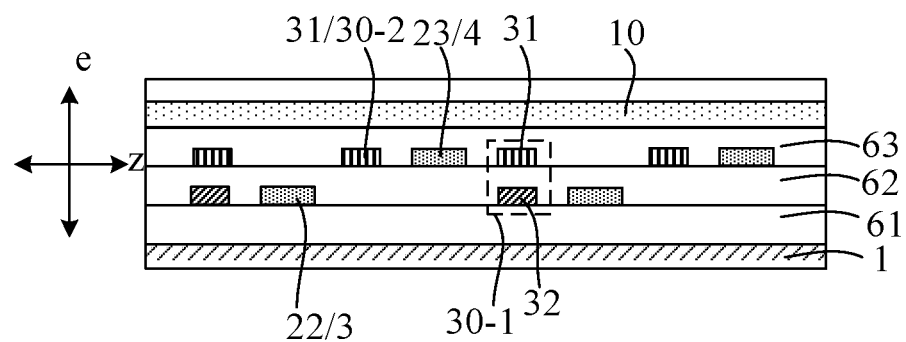
FIG. 17 is another schematic cross-sectional view along tangent line A-A' shown in FIG. 3.

FIG. 17 is another schematic cross-sectional view along tangent line A-A' shown in FIG. 3. In an embodiment, as shown in FIG. 17, the second signal line 20 includes second signal sub-lines 22 and third signal sub-lines 23 that are in an alternating arrangement. The second signal sub-lines 22 are located in the first metal layer 3, the third signal sub-lines 23 are located in the second metal layer 4, and the first signal line 10 is located in the third metal layer 5. The electrostatic buffer units 30 include a first electrostatic buffer unit 30-1 and a second electrostatic buffer unit 30-2. The first electrostatic buffer unit 30-1 includes a first unit portion 31 and a second unit portion 32. The second electrostatic buffer unit 30-2 includes a first unit portion 31. In this embodiment, the first electrostatic buffer unit 30-1 has a structure different from the second electrostatic buffer unit 30-2.

In the arrangement direction of the plurality of second signal lines, the first electrostatic buffer unit 30-1 is located between the second signal sub-line 22 and the third signal sub-line 23, that is, the first electrostatic buffer unit 30-1 is adjacent to two second signal lines. The relative positional relationship between the first electrostatic buffer unit 30-1 and the second signal sub-line 22 is the same as the relative positional relationship between the electrostatic buffer unit 30 and the first signal sub-line 21 that is illustrated in the embodiment of FIG. 13. The first static electricity buffer unit 30-1 can buffer and discharge the static electricity, and can prevent the second signal sub-line 22 from being broken through by the static electricity. The relative positional relationship between the first electrostatic buffer unit 30-1 and the third signal sub-line 23 is the same as the relative positional relationship between the electrostatic buffer unit 30 and the first signal sub-line 21 that is illustrated in the embodiment of FIG. 12. The first static electricity buffer unit 30-1 can buffer and discharge the static electricity, and can prevent the third signal sub-line 23 from being broken through by the static electricity. In this embodiment, the first electrostatic buffer unit 30-1 can perform electrostatic protection on its adjacent two second signal lines.

In the arrangement direction of the plurality of second signal lines, the second electrostatic buffer unit 30-2 is located between the second signal sub-line 22 and the third signal sub-line 23, that is, the second electrostatic buffer unit 30-2 is adjacent to two second signal line. The relative positional relationship between the second electrostatic buffer unit 30-2 and the second signal sub-line 22 is the same as the relative position relationship between the first unit portion 31 and the first signal sub-line 21 that is illustrated in the above embodiment of FIG. 9, and thus the second static electricity buffer unit 30-2 can buffer and discharge the static electricity to prevent the second signal sub-line 22 from being broken through by the static electricity. The relative positional relationship between the second electrostatic buffer unit 30-2 and the third signal sub-line 23 is the same as the relative position relationship between the first unit portion 31 and the first signal sub-line 21 that is illustrated in the above embodiment of FIG. 11, and thus the second static electricity buffer unit 30-2 can buffer and discharge the static electricity to prevent the third signal sub-line 23 from being broken through by the static electricity. In this embodiment, the second electrostatic buffer unit 30-2 can perform electrostatic protection on its adjacent two second signal lines.

Figure 18:
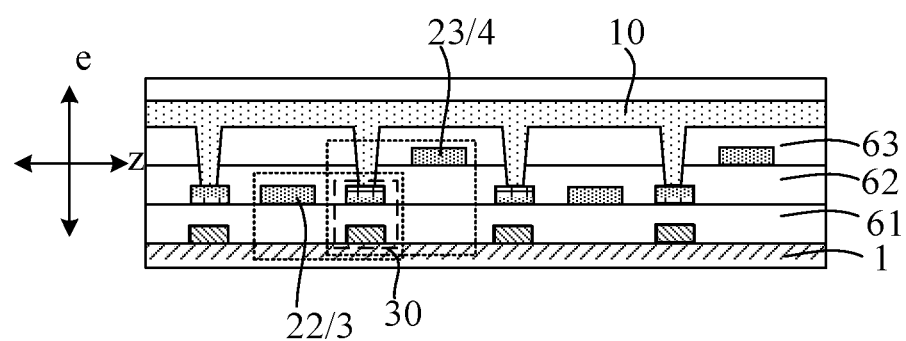
FIG. 18 is another schematic cross-sectional view along tangent line A-A' shown in FIG. 3.

FIG. 18 is another schematic cross-sectional view along tangent line A-A' shown in FIG. 3. In another embodiment, as shown in FIG. 18, an electrostatic buffer unit 30 is provided between the second signal sub-line 22 and the third signal sub-line 23, and these electrostatic buffer units 30 have the same structure. In the arrangement direction of the plurality of second signal lines, the electrostatic buffer unit 30 is located between the second signal sub-line 22 and the third signal sub-line 23, that is, the electrostatic buffer unit 30 is adjacent to two second signal lines. The relative positional relationship between the electrostatic buffer unit 30 and its adjacent second signal sub-line 22 is similar to the relative positional relationship between the electrostatic buffer unit 30 and the first signal sub-line 21 that is illustrated in the embodiment of FIG. 15. The electrostatic buffer unit 30 includes two unit portions, one of the two unit portions that is farther from the substrate 1 is located in a same layer as the second signal sub-line 22, and a thickness of the insulating layer located between the two unit portions of the electrostatic buffer unit 30 is smaller than a thickness of the insulating layer located between the second signal sub-line 22 and the first signal line 10, which can enable the electrostatic buffer unit 30 to perform electrostatic protection on the second signal sub-line 22. The relative positional relationship between the electrostatic buffer unit 30 and the third signal sub-line 23 is the same as the relative positional relationship between the electrostatic buffer unit 30 and the first signal sub-line 21 that is illustrated in the embodiment of FIG. 16, which can enable the buffer unit 30 to buffer and discharge the static electricity, and can prevent the third signal sub-line 23 from being broken through by the static electricity. In this embodiment, the electrostatic buffer unit 30 can realize electrostatic protection on its adjacent two second signal lines.

In another embodiment, as shown in FIG. 8, the second signal sub-lines 22 and the third signal sub-lines 23 are in an alternating arrangement, and the electrostatic buffer unit 30 includes a first electrostatic buffer unit 30-1 and a second electrostatic buffer unit. 30-2. In the arrangement direction of the plurality of second signal lines, the first electrostatic buffer unit 30-1 is located between the second signal sub-line 22 and the third signal sub-line 23, and the second electrostatic buffer unit 30-2 is also located between the second signal sub-line 22 and the third signal sub-line 23. The second electrostatic buffer unit 30-2 and the second signal sub-line 22 are located in the first metal layer 3, the first electrostatic buffer unit 30-1 and the third signal sub-line 23 are located in the second metal layer 4, and the first signal line 10 is located in the third metal layer 5. The third insulating layer 63 is provided between the second metal layer 4 and the third metal layer 5, and the third insulating layer 63 and the second insulating layer 62 are provided between the first metal layer 3 and the third metal layer 5.

The thickness of the insulating layer located between the first electrostatic buffer unit 30-1 and the first signal line 10 is substantially equal to the thickness of the insulating layer located between the third signal sub-line 23 and the first signal line 10, and the thickness of the insulating layer located between the first electrostatic buffer unit 30-1 and the first signal line 10 is smaller than the thickness of the insulating layer located between the second signal sub-line 22 and the first signal line 10, and by setting the width of the first electrostatic buffer unit 30-1 in the third direction z, the first electrostatic buffer unit 30-1 can simultaneously perform electrostatic protection on the second signal sub-line 22 and the third signal sub-line 23 that are adjacent to the first electrostatic buffer unit 30-1.

The thickness of the insulating layer located between the second static buffer unit 30-2 and the first signal line 10 is greater than the thickness of the insulating layer located between the third signal sub-line 23 and the first signal line 10, and the thickness of the insulating layer located between the second electrostatic buffer unit 30-2 and the first signal line 10 is substantially equal to the thickness of the insulating layer located between the second signal sub-line 22 and the first signal line 10, and the second electrostatic buffer unit 30-2 can perform electrostatic protection on its adjacent second signal sub-line 22.

In some embodiments, the electrostatic buffer unit is located on the side of the first signal line 10 facing away from the substrate 1. In the direction perpendicular to the plane of the substrate 1, the distance between the electrostatic buffer unit and the first signal line 10 is not greater than the distance between the second signal line 20 and the first signal line. In this embodiment, the capacitance formed by the electrostatic buffer unit and the first signal line 10 is smaller than the capacitance formed by the second signal line 20 and the first signal line 10, and a distance between the electrostatic buffer unit and the first signal line 10 is relatively small; and thus the insulating layer located between the electrostatic buffer unit and the first signal line 10 is more likely to be broken through, so that the second signal line 20 can be protected.

Figure 19:
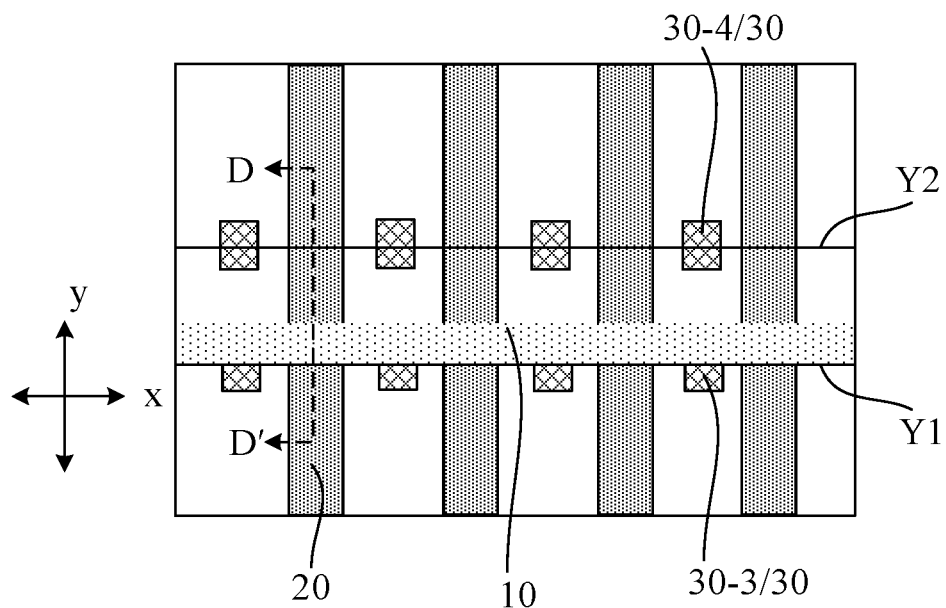
FIG. 19 is another schematic partial top view of a first area of a display panel provided by an embodiment of the present disclosure.
Figure 20:
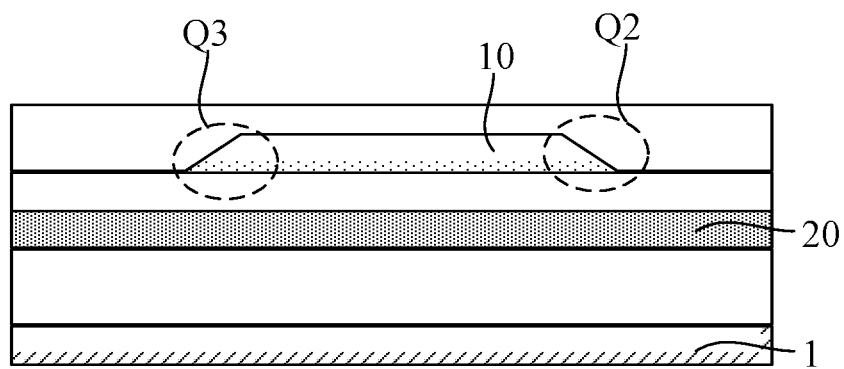
FIG. 20 is a schematic cross-sectional view along tangent line D-D' shown in FIG. 19.

FIG. 19 is another schematic partial top view of a first area of a display panel provided by an embodiment of the present disclosure, and FIG. 20 is a schematic cross-sectional view along tangent line D-D' shown in FIG. 19. In some embodiments, as shown in FIG. 19, the first signal line 10 has a first edge Y1 and a second edge Y2 that extend along the first direction x and are arranged along the second direction y. The first signal line 10 is manufactured by a photolithography process, and a slope will be formed on the etched edge of the first signal line 10 and is shown in the area Q2 and the area Q3 in FIG. 20. In view of the electrostatic breaking through at the position where the first signal line 10 and the second signal line 20 overlap, the metal thickness is thinner at the slope position of the etched edge of the first signal line 10, and the electric field is easy to concentrate at the slope angle position of the slope; and thus discharging is easily to occur at the position where the edge slope of the first signal line 10 overlaps with the second signal line 20, which breaks through the second signal line 20. In view of the above, in the embodiment of the present disclosure, the electrostatic buffer unit overlaps with the edge of the first signal line 10 that extends along the first direction x, so as to buffer and discharge the static electricity at the edge position of the first signal line 10 by the electrostatic buffer unit.

It can be seen from the top view of FIG. 19 that in the direction perpendicular to the substrate 1, the electrostatic buffer unit 30 overlaps with the edge of the first signal line 10 extending along the first direction x. The third static electricity buffer unit 30-3 overlaps with the first edge Y1, and the fourth static electricity buffer unit 30-4 overlaps with the second edge Y2. In the embodiment of the present disclosure, the electrostatic buffer unit 30 at least partially overlaps the edge of the first signal line 10 extending along the first direction x, and the static electricity at the edge of the first signal line 10 extending in the first direction x can be stored and discharged by the electrostatic buffer unit 30, reducing the risk of the second signal line 20 being breaking through by the static electricity.

In another embodiment, referring to FIG. 3, the first signal line 10 has a first edge Y1 and a second edge Y2 that extend in the first direction x and are arranged along the second direction y, and the electrostatic buffer unit 30 overlaps with the first edge Y1 and the second edge Y2 in the direction 1. In this embodiment, the electrostatic buffer unit 30 overlaps with both the first edge Y1 and the second edge Y2, and the static electricity on the first signal line 10 is stored and discharged by the buffer unit 30 to reduce the risk of the second signal line 20 of being breaking through the static electricity.

Figure 21:
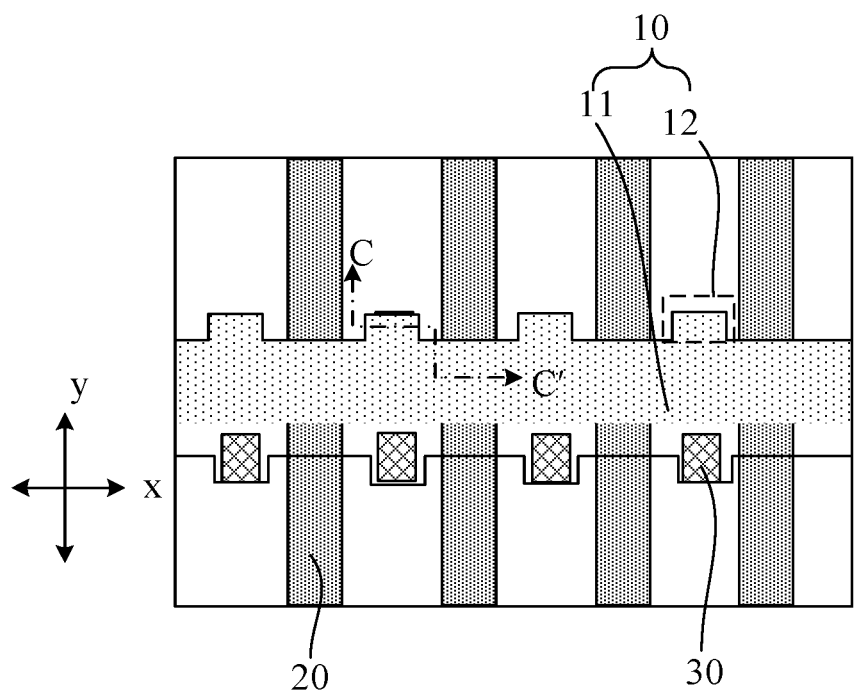
FIG. 21 is another schematic partial top view of a first area of a display panel provided by an embodiment of the present disclosure.
Figure 22:
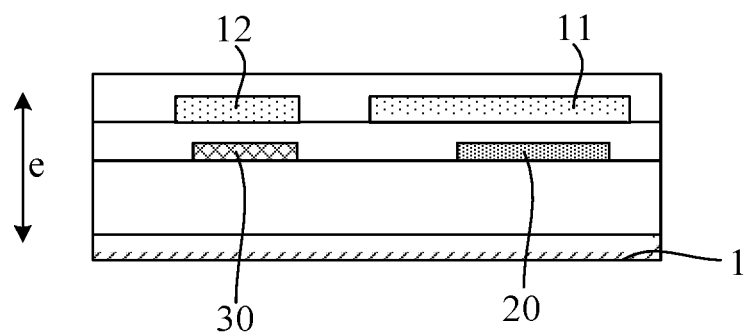
FIG. 22 is another schematic cross-sectional view along tangent line C-C' shown in FIG. 21.

FIG. 21 is another schematic partial top view in a first area of display panel provided by an embodiment of the present disclosure, and FIG. 22 is a schematic cross-sectional view along tangent line C-C' shown in FIG. 21. In another embodiment, as shown in FIG. 21, the first signal line 10 includes a body portion 11 and a protruding portion 12. The body portion 11 extends in a first direction x, and the protruding portion 12 protrudes from the body portion 11 towards a direction away from the body portion 11 along the second direction y. It can be seen from FIG. 22 that the electrostatic buffer unit 30 overlaps with the protrusion 12 in the direction e perpendicular to the plane of the substrate 1. In this embodiment, the shape of the first signal line 10 is designed, the body portion 11 extends along the extending direction of the first signal line 10, and the protruding portion 12 is equivalent to an abrupt structure on the first signal line 10. In this way, the static electricity is easy to accumulate at the protruding portion 12. In the embodiment of the present disclosure, the electrostatic buffer unit 30 is arranged to overlap with the protruding portion 12, and the electrostatic buffer unit 30 can store and discharge the static electricity accumulated at the protruding portion 12, thereby reducing the risk of the second signal line 20 being breaking through by the static electricity.

Figure 23:
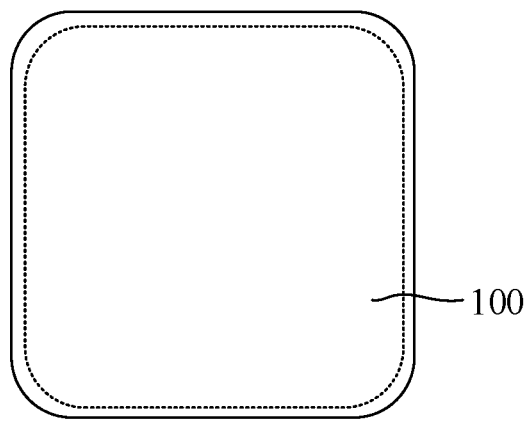
FIG. 23 is a schematic diagram of a display device provided by an embodiment of the present disclosure.

An embodiment of the present disclosure also provides a display device. FIG. 23 is a schematic diagram of a display device provided by an embodiment of the present disclosure. As shown in FIG. 23, the display device includes a display panel 100 provided by any embodiment of the present disclosure. The structure of the display panel 100 has been described in the foregoing embodiments, and will not be repeated herein. The display device in the embodiment of the present disclosure can be any device with a display function, such as a mobile phone, a tablet computer, a notebook computer, an electronic paper book, a television, a smart watch, and the like.

The above are merely some embodiments of the present disclosure, which is not intended to limit the present disclosure. Any modification, equivalent replacements, and improvement, etc., which are made within the principles of the present disclosure, shall fall into the protection scope of the present disclosure.

Finally, it should be appreciate that the above embodiments are only used to illustrate the technical solutions of the present disclosure, rather than limiting them; although the present disclosure has been described in detail with reference to the foregoing embodiments, those skilled in the art should understand that: the technical solutions recorded in the foregoing embodiments can be modified, or make equivalent replacements to some or all of the technical features; and these modifications or replacements do not cause the essence of the corresponding technical solutions to deviate from the scope of the technical solutions provided by the embodiments of the present disclosure.

What is claimed is:

1. A display panel, the display panel having a display area and a non-display area, wherein the display panel comprises:
   a first signal line located in the non-display area;
   second signal lines located in the non-display area;
   a substrate, wherein the first signal line and the second signal lines are located on a same side of the substrate, and the first signal line is located in a different layer from the second signal lines; and
   at least one electrostatic buffer unit,
   wherein the non-display area comprises a first area; in the first area, the first signal line extends in a first direction, and each of the second signal lines extends in a second direction intersecting the first direction; and an orthographic projection of the first signal line on a plane of the substrate at least partially overlaps with an orthographic projection of each of the second signal lines on the plane of the substrate; and
   wherein the at least one electrostatic buffer unit is disposed in the first area, and an orthographic projection of one of the at least one electrostatic buffer unit on the plane of the substrate at least partially overlaps with the orthographic projection of the first signal line on the plane of the substrate;
   wherein one of the at least one electrostatic buffer unit is located on at least one side of at least one of the second signal lines in a direction along which the second signal lines are arranged; wherein the orthographic projection of the one of the at least one electrostatic buffer unit on the plane of the substrate is located between the orthographic projections of two adjacent second signal lines of the second signal lines on the plane of the substrate; and wherein the at least one electrostatic buffer unit comprises at least two electrostatic buffer units, and orthographic projections of the at least two electrostatic buffer units on the plane of the substrate and the orthographic projections of the second signal lines on the plane of the substrate are in an alternating arrangement; or the display panel further comprises a first metal layer, a second metal layer, and a third metal layer that are disposed on a side of the substrate and arranged along a direction away from the substrate, wherein the second signal lines comprise second signal sub-lines and third signal sub-lines that are in an alternating arrangement, the second signal sub-line is located in the first metal layer, and the third signal sub-line is located in the second metal layer; or wherein in a direction perpendicular to the substrate, one of the at least one electrostatic buffer unit overlaps with an edge of the first signal line extending in the first direction; and wherein the first signal line has a first edge and a second edge that extend in the first direction and are arranged in the second direction; and the at least one electrostatic buffer unit comprises at least two electrostatic buffer units, wherein one of the at least two electrostatic buffer unit overlaps with the first edge in a direction perpendicular to the substrate, and another one of the at least two electrostatic buffer units overlaps with the second edge in the direction perpendicular to the substrate.

2. The display panel of claim 1, wherein one of the at least one electrostatic buffer unit has a width in a third direction that is smaller than a width of one of the second signal lines in the third direction, and the third direction is perpendicular to the second direction.

3. The display panel of claim 1, wherein the first signal line comprises a body portion and a protrusion portion, wherein the body portion extends in the first direction, and the protrusion portion protrudes along the second direction and protrudes from the body portion towards a direction away from the body portion; and one of the at least one electrostatic buffer unit overlaps with the protrusion portion in a direction perpendicular to the substrate.

4. A display panel, the display panel having a display area and a non-display area, wherein the display panel comprises:
a first signal line located in the non-display area; second signal lines located in the non-display area; a substrate, wherein the first signal line and the second signal lines are located on a same side of the substrate, and the first signal line is located in a different layer from the second signal lines; and at least one electrostatic buffer unit, wherein the non-display area comprises a first area; in the first area, the first signal line extends in a first direction, and each of the second signal lines extends in a second direction intersecting the first direction; and an orthographic projection of the first signal line on a plane of the substrate at least partially overlaps with an orthographic projection of each of the second signal lines on the plane of the substrate; and wherein the at least one electrostatic buffer unit is disposed in the first area, and an orthographic projection of one of the at least one electrostatic buffer unit on the plane of the substrate at least partially overlaps with the orthographic projection of the first signal line on the plane of the substrate, wherein the at least one electrostatic buffer unit is located at a side of the first signal line facing towards the substrate;

wherein the second signal lines comprise a first signal sub-line, and an orthographic projection of the first signal sub-line on the plane of the substrate is adjacent to an orthographic projection of one of the at least one electrostatic buffer unit on the plane of the substrate; and wherein each of the at least one electrostatic buffer unit comprises a first unit portion; and a distance between the first unit portion and the first signal line along a direction perpendicular to the substrate is $d1$, and a distance between the first signal sub-line and the first signal line is $d2$, where $d1 \leq d2$; or wherein the second signal lines comprise a first signal sub-line, wherein an orthographic projection of the first signal sub-line on the plane of the substrate is adjacent to an orthographic projection of one of the at least one electrostatic buffer unit on the plane of the substrate; each of the at least one electrostatic buffer unit comprises a third unit portion located at a side of the first signal sub-line facing towards the substrate, and a fourth unit portion located at a side of the third unit portion facing towards the substrate; and the third unit portion at least partially overlaps with the fourth unit portion in the direction perpendicular to the substrate, and the third unit portion is connected to the first signal line.

5. The display panel of claim 4, further comprising:
wherein the second signal lines comprise a first signal sub-line, and an orthographic projection of the first signal sub-line on the plane of the substrate is adjacent to an orthographic projection of one of the at least one electrostatic buffer unit on the plane of the substrate; and wherein each of the at least one electrostatic buffer unit comprises a first unit portion; and a distance between the first unit portion and the first signal line along a direction perpendicular to the substrate is $d1$, and a distance between the first signal sub-line and the first signal line is $d2$, where $d1 \leq d2$;
a first metal layer, a second metal layer, and a third metal layer that are disposed on a side of the substrate and arranged along a direction away from the substrate, wherein the first signal line is located in the third metal layer, the first signal sub-line is located in the first metal layer, and the first unit portion is located in one of the first metal layer and the second metal layer.

6. The display panel of claim 4, further comprising:
a first metal layer, a second metal layer, and a third metal layer that are disposed on a side of the substrate and arranged along a direction away from the substrate, wherein the first signal line is located in the third metal layer, the first signal sub-line is located in the second metal layer, and the first unit portion is located in the second metal layer.

7. The display panel of claim 4, wherein each of the at least one electrostatic buffer unit further comprises a second unit portion located at a side of the first unit portion facing towards the substrate, wherein the first unit portion at least partially overlaps with the second unit portion in the direction perpendicular to the substrate.

8. The display panel of claim 7, further comprising:
a semiconductor layer, a first metal layer, a second metal layer, and a third metal layer that are disposed on a side of the substrate and arranged along a direction away from the substrate, wherein the first signal line is located in the third metal layer, the first signal sub-line is located in the second metal layer, the first unit portion is located in the second metal layer, and the second unit portion is located in the first metal layer or the semiconductor layer.

9. The display panel of claim 7, further comprising:
a semiconductor layer, a first metal layer, a second metal layer, and a third metal layer that are disposed on a side of the substrate and arranged along a direction away from the substrate,
wherein the first signal line is located in the third metal layer, and the first signal sub-line is located in the first metal layer; and wherein the first unit portion is located in the second metal layer, and the second unit portion is located in the first metal layer; or the first unit portion is located in the first metal layer, and the second unit portion is located in the semiconductor layer.

10. The display panel of claim 7, wherein the first unit portion is electrically connected to the first signal line.

11. The display panel of claim 4, further comprising:
wherein the second signal lines comprise a first signal sub-line, wherein an orthographic projection of the first signal sub-line on the plane of the substrate is adjacent to an orthographic projection of one of the at least one electrostatic buffer unit on the plane of the substrate; each of the at least one electrostatic buffer unit comprises a third unit portion located at a side of the first signal sub-line facing towards the substrate, and a fourth unit portion located at a side of the third unit portion facing towards the substrate; and the third unit portion at least partially overlaps with the fourth unit portion in the direction perpendicular to the substrate, and the third unit portion is connected to the first signal line;
a semiconductor layer, a first metal layer, a second metal layer, and a third metal layer that are disposed on a side of the substrate and arranged along a direction away from the substrate, wherein the first signal line is located in the third metal layer, the first signal sub-line is located in the second metal layer, the third unit portion is located in the first metal layer, and the fourth unit portion is located in the semiconductor layer.

12. A display device, comprising a display panel having a display area and a non-display area, wherein the display panel comprises:
a first signal line located in the non-display area;
second signal lines located in the non-display area;
a substrate, wherein the first signal line and the second signal lines are located on a same side of the substrate, and the first signal line is located in a different layer from the second signal lines; and
at least one electrostatic buffer unit,
wherein the non-display area comprises a first area; in the first area, the first signal line extends in a first direction, and each of the second signal lines extends in a second direction intersecting the first direction; and an orthographic projection of the first signal line on a plane of the substrate at least partially overlaps with an orthographic projection of each of the second signal lines on the plane of the substrate; and
wherein the at least one electrostatic buffer unit is disposed in the first area, and an orthographic projection of one of the at least one electrostatic buffer unit on the plane of the substrate at least partially overlaps with the orthographic projection of the first signal line on the plane of the substrate.

* * * * *